United States Patent
Schupska

(10) Patent No.: US 8,281,457 B2
(45) Date of Patent: Oct. 9, 2012

(54) GROMMET FOR THROUGH BODY PIPE MOUNTING IN A VEHICLE

(75) Inventor: Peter Michael Schupska, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 362 days.

(21) Appl. No.: 12/464,385

(22) Filed: May 12, 2009

(65) Prior Publication Data

US 2010/0287728 A1 Nov. 18, 2010

(51) Int. Cl.
*H01R 13/00* (2006.01)

(52) U.S. Cl. .............. 16/2.5; 248/56; 248/74.2

(58) Field of Classification Search ........ 16/2.1, 16/2.2, 2.5; 174/152 G, 153 G, 668; 248/56, 248/74.2; 277/606, 616; 285/104, 192; 74/502.4; 264/250, 254, 255

See application file for complete search history.

(56) References Cited

U.S. PATENT DOCUMENTS

| | | | |
|---|---|---|---|
| 2,897,533 A | 8/1959 | Bull et al. | |
| 3,139,768 A * | 7/1964 | Biesecker | 74/502.4 |
| 4,304,148 A | 12/1981 | Hamman | |
| 4,324,503 A | 4/1982 | Sevrence | |
| 4,505,354 A * | 3/1985 | Suzuki et al. | 180/297 |
| 4,726,558 A | 2/1988 | Ozone et al. | |
| 5,052,722 A | 10/1991 | Kubo et al. | |
| 5,582,074 A * | 12/1996 | Kelley et al. | 74/502.4 |
| 5,668,415 A * | 9/1997 | Nagami | 307/9.1 |
| 6,595,556 B1 | 7/2003 | Zenko et al. | |
| 6,677,524 B2 | 1/2004 | Fukumoto et al. | |
| 6,680,437 B2 | 1/2004 | Sato | |
| 6,752,426 B2 * | 6/2004 | Kacines et al. | 280/782 |
| 6,815,615 B1 | 11/2004 | Haulotte et al. | |
| 6,825,416 B2 | 11/2004 | Okuhara | |
| 6,830,075 B1 | 12/2004 | McKinney et al. | |
| 6,995,316 B1 | 2/2006 | Goto | |
| 7,388,156 B2 | 6/2008 | Knagge | |
| 2006/0273226 A1 | 12/2006 | Jatzke | |

FOREIGN PATENT DOCUMENTS

| | | |
|---|---|---|
| DE | 19840085 A1 | 2/2001 |
| GB | 2 158 143 A | 11/1985 |
| JP | 09170682 A * | 6/1997 |

* cited by examiner

*Primary Examiner* — William L. Miller

(74) *Attorney, Agent, or Firm* — Rankin Hill & Clark LLP

(57) ABSTRACT

A grommet assembly for installation in an opening of a vehicle body component is provided. The opening is dimensioned to receive a pipe therethrough. The grommet assembly comprises a first relatively stiff component and a second relatively flexible component. The first component has retention elements formed therewith to secure the pipe to the grommet assembly. The second component is sized to be securely mounted in the body component opening. The second component is at least partially overmolded onto the first component. The grommet assembly is pre-mounted on the pipe and is configured to keep the pipe generally centered in the body component opening.

19 Claims, 4 Drawing Sheets

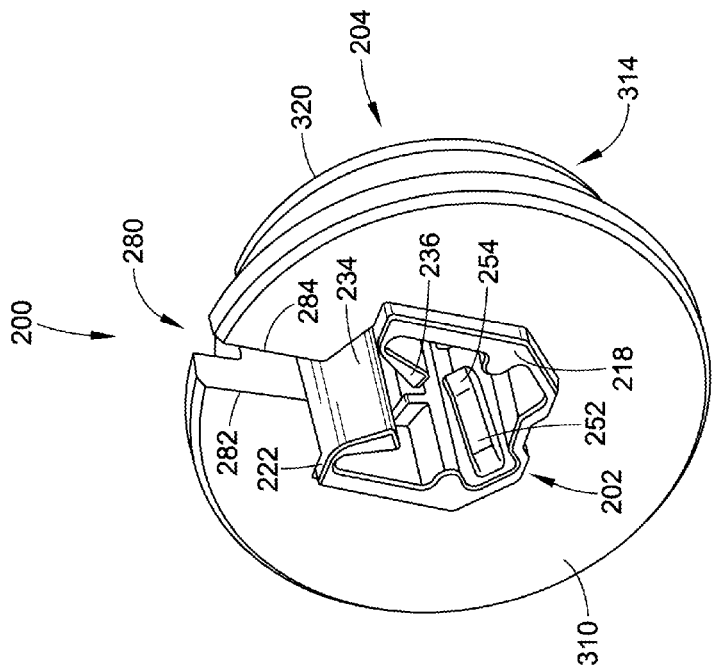
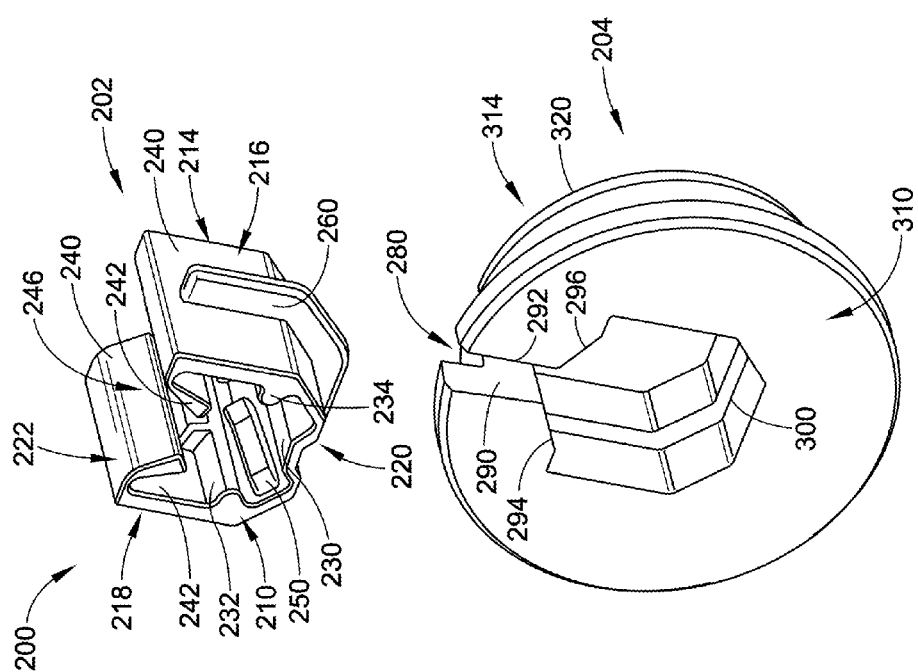
FIG. 4
FIG. 5

GROMMET FOR THROUGH BODY PIPE MOUNTING IN A VEHICLE

BACKGROUND

Exemplary embodiments herein relate to a robust grommet for leading wires, conduit, pipe, and the like through a vehicle body component. More particularly, an exemplary embodiment is directed to a robust grommet for leading a brake pipe through the vehicle body component.

It is known to provide a flexible rubber or rubber-like grommet for leading a pipe through an opening in a vehicle body component. In general, the purpose of the grommet is to reduce concern for chafing and wear due to movement of the pipe and also to provide a dust and moisture seal, especially where the opening defines an interface between the interior of the body and the outside environment. Current brake pipe layout in an engine room requires the pipe to run through the vehicle body component from a modulator to front wheel brake hose joints. A clip is typically set in close proximity to a body throughhole, and a rubber grommet is set in the hole to protect the brake pipe from contact with the sharp body edge formed by the throughhole. However, the clip cannot fully control the pipe as it passes through the grommet in the body, and the result is often a touch condition to the grommet. In an effort to control this contact more effectively, a grommet having a higher pipe retention is desired, so as to keep the brake pipe centered in the throughhole as it crosses from the engine room to the wheel house.

BRIEF DESCRIPTION

In accordance with one aspect, a grommet assembly for installation in an opening of a vehicle body component is provided. The opening is dimensioned to receive a pipe therethrough. The grommet assembly comprises a first relatively stiff component and a second relatively flexible component. The first component has retention elements formed therewith to secure the pipe to the grommet assembly. The second component is sized to be securely mounted in the body component opening. The second component is at least partially overmolded onto the first component. The grommet assembly is pre-mounted on the pipe and is configured to keep the pipe generally centered in the body component opening.

In accordance with another aspect, a vehicle brake pipe assembly comprises a body component having an opening formed therein. The body component separates an engine compartment and a wheel house. A brake pipe is configured to traverse the opening. A grommet assembly is installed in the opening for routing the brake pipe through the opening. The grommet assembly includes a generally rigid clip configured to be securely mounted to the brake pipe and an elastomeric component configured to be securely mounted in the opening. The elastomeric component at least partially encapsulates an outer surface of the clip. The grommet assembly is secured to the brake pipe prior to mounting in the opening and provides a fixing point for the brake pipe at a center of the opening. The grommet assembly has an increased thickness relative to the body component to resist deformation caused by brake pipe misalignment through the opening.

In accordance with yet another aspect, a vehicle brake pipe assembly comprises a body component having an opening formed therein. The body component separates an engine compartment and a wheel house. A brake pipe is configured to traverse the opening. A grommet assembly is pre-mounted on the brake pipe for installation in the opening. The grommet assembly includes a generally rigid clip configured to be securely mounted to the brake pipe and generally C-shaped elastomeric component configured to be securely mounted in the opening. The clip includes an outer surface having a radial ridge. The elastomeric component is overmolded onto the radial ridge of the clip. The radial ridge improves retention of the clip within the elastomeric component.

In accordance with still yet another aspect, a method of installing a brake pipe to a body component of a vehicle is provided. The body component has an opening formed therein for receiving the brake pipe. A generally rigid clip is provided. The clip is configured to be securely mounted to the brake pipe. The clip is overmolded with an elastomeric material. The clip and overmolded elastomeric material together form a grommet assembly for routing the brake pipe through the opening. The brake pipe is positioned through the body component opening. The grommet assembly is secured to the brake pipe prior to mounting of the grommet assembly in the opening. The secured grommet assembly is mounted in the body compartment opening. The grommet assembly provides a fixing point for the brake pipe at a center of the body component opening.

BRIEF DESCRIPTION OF THE DRAWINGS

FIG. 4 is a perspective view of an exemplary embodiment of a grommet assembly.

FIG. 5 is an exploded perspective view of FIG. 4.

DETAILED DESCRIPTION

Figure 1:
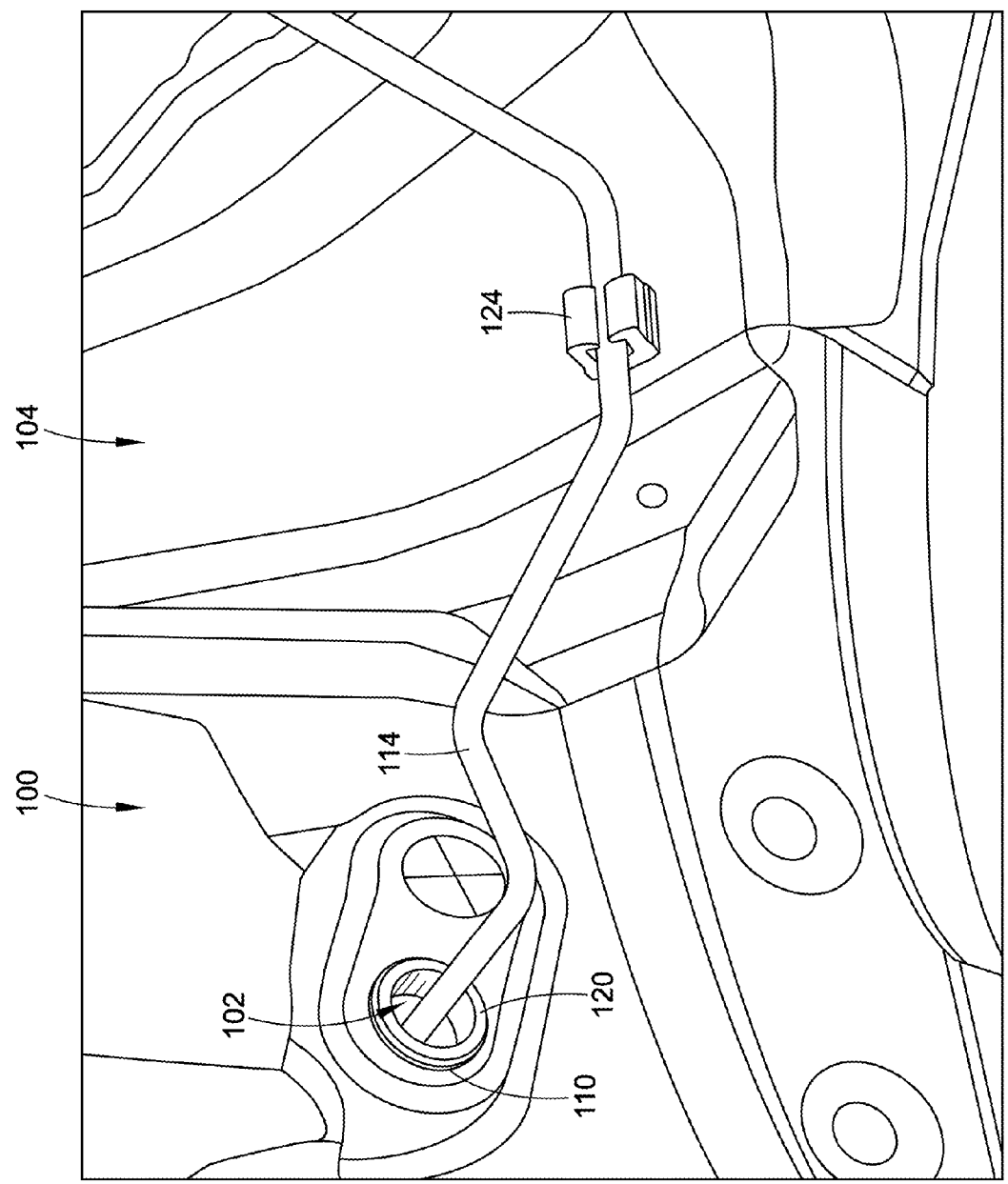
FIG. 1 is a schematic illustration of a vehicle body component including a throughhole and a conventional grommet located therein for passage of a brake pipe from an engine room to a wheel house.

It should, of course, be understood that the description and drawings herein are merely illustrative and that various modifications and changes can be made in the structures disclosed without departing from the present disclosure. It will also be appreciated that the various identified components of the vehicle and grommet assembly described herein are merely terms of art that may vary from one vehicle manufacturer to another and should not be deemed to limit the present disclosure. All references to direction and position, unless otherwise indicated, refer to the orientation of the grommet illustrated in the drawings and should not be construed as limiting the claims appended hereto. Like numerals refer to like parts throughout the several views.

Referring now to the drawings wherein the showings are for purposes of illustrating one or more exemplary embodiments only and not for purposes of limiting the same, FIG. 1 schematically illustrates a conventional body component 100 for a vehicle, which can be a large vehicle (e.g. a sports utility vehicle), for example. The body component 100 separates the vehicle engine room or compartment 102 from one of the wheel houses 104. The body component 100 includes a throughhole or opening 110 for passage of a brake pipe 114. The brake pipe generally runs through the body component 100 from a modulator to front wheel brake hose joints (both not shown). A grommet 120 is secured within the opening 110 to protect the brake pipe 114 from damage caused by inadvertent contact with a sharp edge of the opening.

Typical sport utility vehicle layouts allow the brake pipe 114 to traverse the body component opening 110 generally perpendicular to the body component 100. Due to tolerances of the body component and brake pipe, it can be difficult to control the layout of the brake pipe as it passes through the body component from the engine room to the wheel house. As shown, the current countermeasure is to mount a brake clip 124 to the body component 100 in close proximity to the opening 110. The brake clip is configured to securely retain therein the brake pipe 114. However, the brake clip 124 cannot fully control the brake pipe 114 as it passes through the grommet 120 in the body component, and the result is often a touch condition to the grommet 120. This touch condition can cause an undesirable wearing of one of the grommet 120 and the brake pipe 114. One way to protect the brake pipe and/or grommet from damage due to this contact is to increase the size of the opening 110 and grommet. However, this can lead to an increase of dust, water, salt intrusion, etc. into the engine room. Not shown, a known countermeasure for such intrusion is to apply flaps, which can together generally form an X-shape, to the interior of the enlarged grommet. These flaps do not, however, increase the stiffness of the grommet 120 enough to control the layout of the brake pipe 114.

Figure 2:
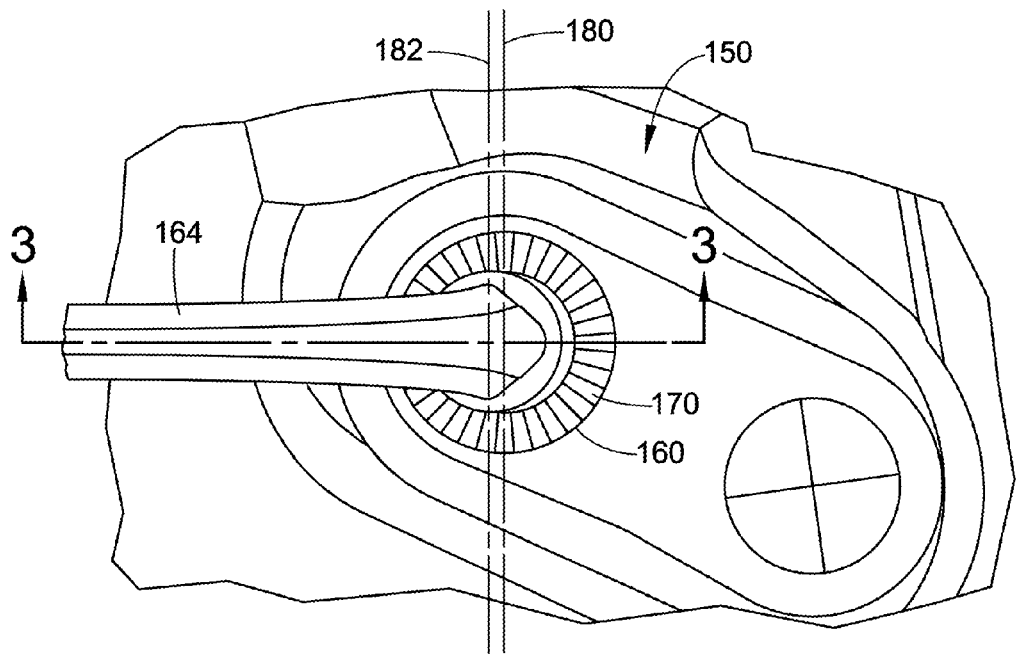
FIG. 2 is an enlarged schematic illustration of another vehicle body component including a throughhole and another conventional grommet located therein for passage of a brake pipe, the brake pipe being off center from the grommet.
Figure 3:
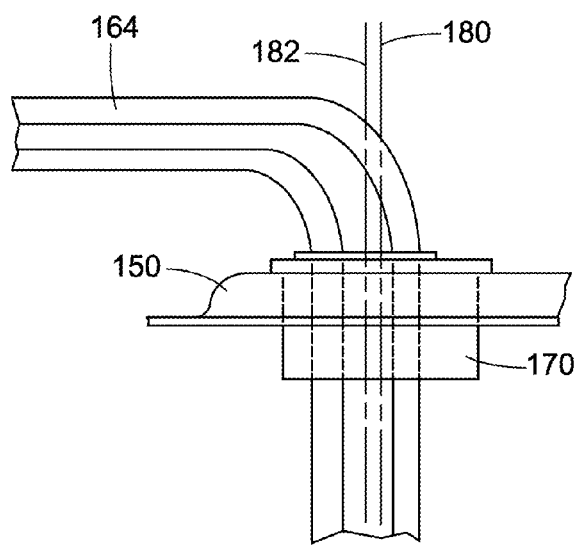
FIG. 3 is a cross-sectional view of FIG. 2 taken along line 3-3 of FIG. 2.

With reference to FIGS. 2 and 3, another conventional body component 150 for a vehicle, which can be a smaller vehicle, is schematically illustrated. The body component 150 includes a throughhole or opening 160 for passage of a brake pipe 164. A grommet 170 is secured within the opening 160 to protect the brake pipe 164. Typically, smaller vehicle layouts require that the brake pipe traverse the opening at a lower angle due to the tight layout space in the engine room. A clip (not shown) is set in close proximity to the opening 160. However, the clip cannot fully control the pipe as it passes through the grommet in the body component opening. Particularly, as shown, the opening 160 defines a center line 180. Because the clip cannot keep the brake pipe 164 centered in the opening 160, the brake pipe 164 defines a center axis 182 which is offset from the center axis 180. The result is often a touch condition to the grommet 170 which can damage the brake pipe.

With reference now to FIGS. 4 and 5, in an effort to control the inadvertent contact between the conventional grommet and brake pipe, a grommet assembly 200 for installation in an appropriately sized opening in a vehicle body component or such other structure in which the grommet assembly is to be installed is provided. In an exemplary embodiment, the grommet assembly 200 is appropriately sized and installed in opening 110 of the vehicle body component 100 for routing the brake pipe 114 through the opening. It should be appreciated that the grommet assembly can also be installed in the opening 160 of the vehicle body component 150 for routing the brake pipe 164 therethrough. The grommet assembly 200 has a higher brake pipe retention to keep the brake pipe generally centered in the throughhole 110 as it crosses from the engine room to the wheel house. The grommet assembly 200 comprises a first relatively stiff component or clip 202 and a second relatively flexible component or grommet 204.

Figure 6:
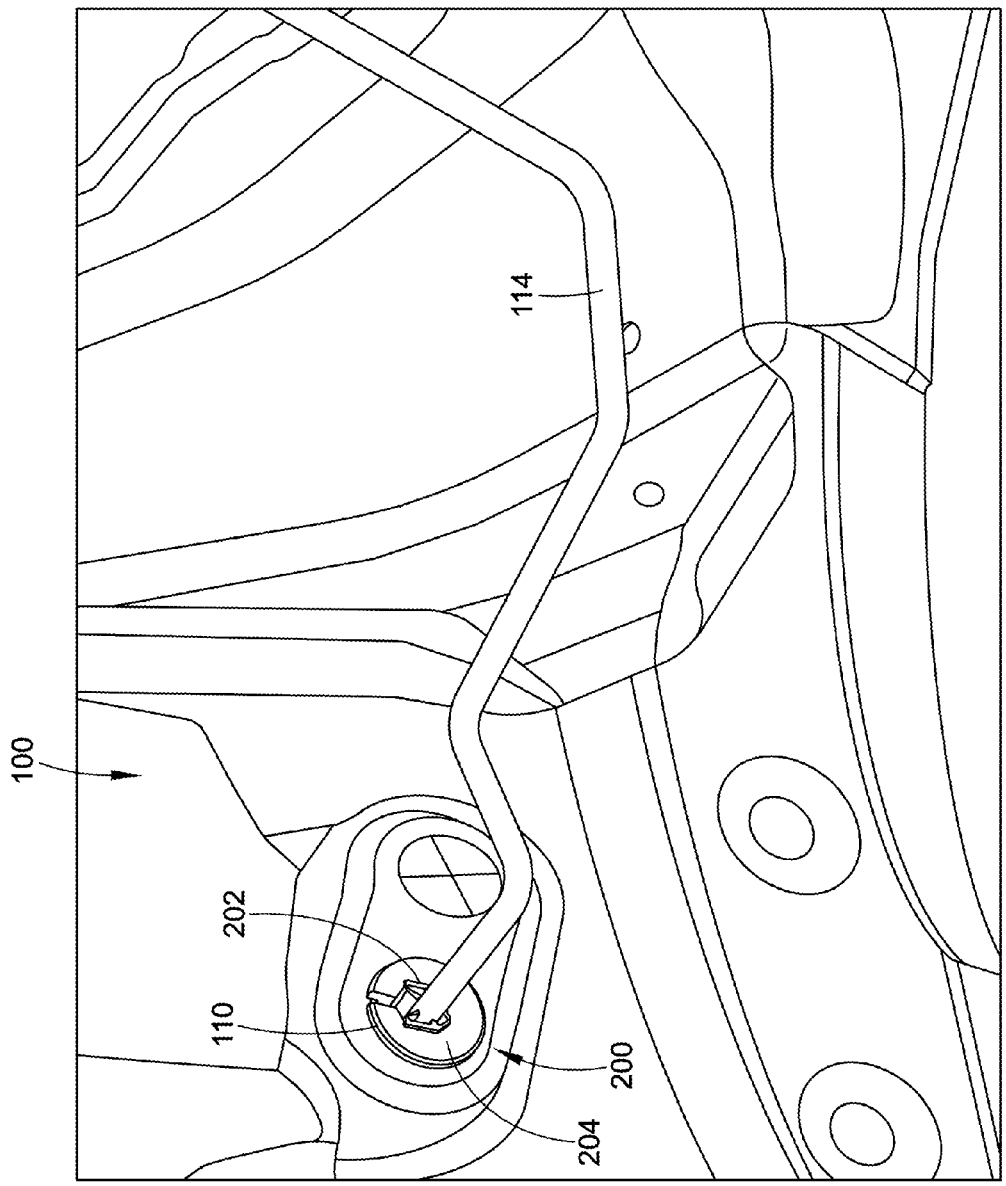
FIG. 6 is a schematic illustration of the grommet assembly of FIG. 4 located in the throughhole of the vehicle body component of FIG. 1.

As shown in FIG. 6, the grommet assembly 200 is mounted on the brake pipe 114 prior to installation in the vehicle body component opening 110. The grommet assembly is then installed in the opening 110 of vehicle body component 100 thereby providing a fixing point for the brake pipe 114 at the center of the opening. The clip 202 is configured to be securely mounted to the brake pipe 114. The grommet 204, after being securely mounted in the body component opening 110, is configured to bear down against the clip 202 and compress the clip against the brake pipe 114. This compression increases stiffness of the grommet assembly 200 and resists deformation of the grommet assembly which can be caused by brake pipe misalignment through the opening 110. Particularly, the grommet assembly 200 has an increased thickness relative to the body component 100 to resist such deformation. The grommet assembly 200 further eliminates a need for a separate brake pipe clip to maintain brake pipe layout in the vehicle.

The clip 202 can be made of a relatively rigid plastic such as high-density polyethylene. As shown in FIGS. 4 and 5, the generally U-shaped clip 202 comprises a first end wall 210, a second end wall 214, opposed side walls 216 and 218, a bottom wall 220 and a top wall 222. Each side wall has a generally chevron shape and extends between the first and second end walls. The bottom wall 220 includes a centrally raised section 230 and each side wall 216, 218 includes an inwardly extending flange 232, 234. The raised section and the flanges engage the brake pipe and provide support to the brake pipe as it is secured in the clip 202. The top wall 222 has a pair of opposed arms 240 and 242, which are inclined inwardly generally toward a center of the clip. The ends of the arms are spaced apart to define a clip opening 246. Retention elements 250 (only one retention element is visible) are formed within the clip 202 and together with the opposed arms 240, 242 secure the brake pipe 114 to the grommet assembly 200. Each retention element includes a first end 252 secured to an inner surface of one of the side walls 216, 218 and a second end 254, which is turned slightly upward toward the clip opening 246. The second end can be displaceable for urging the brake pipe upwardly against the opposed arms 240, 242.

The clip 202 further includes a radially extending ridge 260 which generally circumscribes an outer surface of the clip. The ridge generally conforms to the shape of the side walls 216, 218 and bottom wall 220. The ridge 260 is equally spaced from the first and second end walls 210, 214, and opposed ends of the ridge are spaced from the top wall 222. As will be discussed in greater detail below, the ridge 260 is configured to improve retention of the clip 202 within the grommet 204.

The grommet 204 can be made of a relatively soft, flexible or elastomeric material such as EPDM rubber so as to be easily mounted in the body component opening 110, 160. With continued reference to FIGS. 4 and 5, the grommet 204 is generally C-shaped and includes a slotted opening 280 for passage of the brake pipe 114, 164 into the clip 202. The slotted opening is defined by a first end wall 282 and a second end wall 284, which faces the first end wall. Each end wall 282 and 284 includes a respective generally vertical first section 290, 292 and a respective second section 294, 296. The first sections are spaced apart a predetermined distance such that the first sections are displaced outwardly by the insertion of the brake pipe 114, 164. In the depicted embodiment, the spacing of the first sections is less than the spacing of the arms 240, 242 of the clip 202; although, this is not required. The second end sections 294, 296 are flared outwardly generally toward the top wall 222 of the clip 202 for ease of insertion of the brake pipe through the slotted opening 280.

The elastomeric grommet 204 is at least partially overmolded onto the clip 202. To this end, the grommet assembly 200 can be formed by insert molding. According to one exemplary method, the clip 202 is disposed between mating components of an insert mold. The two mating mold components after mating form the closed insert mold having a cavity containing the clip. The mold components can be designed with respective molding regions to allow the grommet 204 to encapsulate at least a portion of the outer surface of the clip 202. The molding process seals the overmolded grommet 204 to the clip 202 by at least partially encapsulating the clip. This ensures that the clip 202 does not become disconnected from the grommet 204. As shown in FIGS. 4 and 5, the grommet has an axial length which is less than an axial length of the clip. In addition, the molding process forms a groove 300 within the grommet 204 that surrounds the ridge 260. This improves retention of the clip 202 within the grommet 204. The insert molding process described above is an illustrative example. Substantially any insert molding process can be employed to form the grommet assembly 200.

As indicated previously, the slotted opening 280 of the grommet 204 allows assembly of the grommet assembly 200 to the brake pipe prior to mounting of the grommet assembly in the body component opening 110. As shown in FIG. 6, after mounting of the brake pipe 114, the grommet assembly 200 is press fit within the opening 110. As indicated previously, the grommet 204 is configured to bear down against the outer surface of the clip 202 and compress the clip 202 against the brake pipe 114. Particularly, the axial depth of the grommet 204 is such as to squeeze or compress the end walls 282 and 284 toward one another which, in turn, compresses the opposed arms 240 and 242 of the clip 202 against the brake pipe 114. This further enhances the effectiveness of the retention feature the grommet assembly 200. The grommet 204 is also dimensioned to generally close the body component opening 110. This reduces dust, water and salt intrusion through the body component opening.

With reference again to FIGS. 4 and 5, the grommet 204 includes a generally disc-shaped first portion or radial flange 310 having a dimension greater than a dimension of the vehicle body component opening 110. In the assembled condition, the flange abuts the body component 100 thereby preventing axial movement of the grommet in the opening. A generally cylindrical-shaped second portion 314 projects from the flange 310. The second portion is mounted within the body component opening 110. An end 320 of the second portion 314 includes a reduced radial dimension for ease of insertion through the body component opening 110.

Advantageously, in the grommet assembly 200, the size of the conventional grommet is retained, so no change is needed for the vehicle body component opening. The interior of the grommet assembly 200 is no longer open with thin flaps used to reduce debris intrusion. The grommet 204 is overmolded onto the generally rigid clip 202. The clip is fitted with the radial ridge 200 to increase retention inside the elastomeric grommet. The clip offers a high retention force for the brake pipe. The grommet assembly 200 has an increased thickness on the interior to resist deformation from a misaligned brake pipe. The grommet assembly 200 more effectively secures the brake pipe layout, continues to protect the brake pipe from damage due to contact and improves the robustness of the layout by providing a fixing point for the brake pipe 114, 164 at the center of the body component opening 110, 160. The grommet assembly 200 is more robust to prevent intrusion of dust, water and salt to the engine room. The grommet assembly 200 also reduces the total part count on the vehicle by eliminating the need for a separate brake pipe clip and still securing the brake pipe layout.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims or the equivalents thereof.

What is claimed is:

1. A grommet assembly for installation in an opening of a vehicle body component, the opening being dimensioned to receive a pipe therethrough, the grommet assembly comprising:
   a first relatively stiff component having retention elements formed therewith to secure the pipe to the first component and the grommet assembly, the first component including a first end wall, a second end wall and an outer surface; and
   a second relatively flexible component sized to be securely mounted in the body component opening, the second component including a first end and a second end and is at least partially overmolded onto the outer surface of the first component such that the second component is non-removably connected to the first component, and an axial length measured from the first end to the second end of the second component is less than an axial length measured from the first end wall to the second end wall of the first component such that at least one of the first and second end walls of the first component project outwardly from at least one of the first and second ends of the second component,
   wherein the grommet assembly is pre-mounted on the pipe and is configured to keep the pipe generally centered in the body component opening.

2. The grommet assembly of claim 1, wherein the second component is generally C-shaped.

3. The grommet assembly of claim 1, wherein the first component includes a ridge to improve retention within the second component.

4. The grommet assembly of claim 3, wherein first component is generally U-shaped, the ridge circumscribing the outer surface of the first component.

5. The grommet assembly of claim 4, wherein the ridge is spaced from the first and second end walls.

6. The grommet assembly of claim 1, wherein the second component includes a slotted opening to allow assembly of the grommet assembly to the pipe prior to mounting of the grommet assembly in the body component opening.

7. The grommet assembly of claim 6, wherein the slotted opening of second component, after being securely mounted in the body component opening, is configured to bear down against the first component and compress the first component against the pipe.

8. The grommet assembly of claim 1, wherein the second component is dimensioned to generally close the body component opening for reducing dust and water intrusion through the body component opening.

9. The grommet assembly of claim 8, wherein the second component includes a generally disc-shaped first portion having a dimension greater than a dimension of the body component opening and a generally cylindrical-shaped second portion projecting from the first portion, the first portion abutting the vehicle body component, the second portion being mounted in the body component opening.

10. The grommet assembly of claim 9, wherein the second portion includes a reduced dimension for ease of insertion through the body component opening.

11. The grommet assembly of claim 1, wherein the vehicle body component is a wall separating an engine compartment and a wheel house and the pipe is a brake pipe, wherein the second component, after being securely mounted in the body component opening, is configured to bear down against the first component and compress the first component against the brake pipe to increase stiffness and resist deformation of the grommet assembly caused by brake pipe misalignment.

12. A vehicle brake pipe assembly comprising:
- a body component having an opening formed therein, the body component separating an engine compartment and a wheel house;
- a brake pipe configured to traverse the opening; and
- a grommet assembly for installation in the opening for routing the brake pipe through the opening, the grommet assembly including a generally rigid clip configured to be securely mounted to the brake pipe and an elastomeric component configured to be securely mounted in the opening, the elastomeric component at least partially encapsulating an outer surface of the clip,
- wherein the grommet assembly is secured to the brake pipe prior to mounting in the opening and provides a fixing point for the brake pipe at a center of the opening,
- wherein the grommet assembly has an increased thickness relative to the body component to resist deformation caused by brake pipe misalignment through the opening,
- wherein the elastomeric component includes a slotted opening for passage of the brake pipe into the clip, and the clip includes a top wall having a pair of opposed arms defining a clip opening, and the slotted opening is defined by a first wall and a second wall, the first and second walls projecting toward the clip top wall.

13. The vehicle brake pipe assembly of claim 12, wherein the elastomeric component is generally C-shaped.

14. The vehicle brake pipe assembly of claim 13, wherein the ends of the opposed arms of the clip are spaced apart to define the clip opening, each arm being inclined inwardly generally toward a center of the clip, and the first and second walls being flared outwardly generally toward the clip top wall.

15. The vehicle brake pipe assembly of claim 12, wherein the outer surface of the clip includes a radial ridge to improve retention within the elastomeric component.

16. The vehicle brake pipe assembly of claim 15, wherein the elastomeric component is overmolded onto the clip, the elastomeric component encapsulating the radial ridge of the clip.

17. The vehicle brake pipe assembly of claim 12, wherein the elastomeric component includes a radial flange having a dimension greater than a dimension of the opening for preventing axial movement of the elastomeric component in the opening.

18. A vehicle brake pipe assembly comprising:
- a body component having an opening formed therein, the body component separating an engine compartment and a wheel house;
- a brake pipe configured to traverse the opening; and
- a grommet assembly pre-mounted on the brake pipe for installation in the opening, the grommet assembly including:
  - a generally rigid clip configured to be securely mounted to the brake pipe, the clip including an outer surface having a radial ridge, and
  - a generally C-shaped elastomeric component configured to be securely mounted in the opening, the elastomeric component overmolded onto the radial ridge of the clip, the radial ridge improving retention of the clip within the elastomeric component,
- wherein the elastomeric component is press fit within the opening, the elastomeric component, after being securely mounted in the opening, configured to bear down against the outer surface of the clip and compress the clip against the pipe.

19. A method of installing a brake pipe to a body component of a vehicle, the body component having an opening formed therein for receiving the brake pipe, the method comprising:
- providing a generally rigid clip configured to be securely mounted to the brake pipe;
- overmolding the clip with an elastomeric material, the clip and overmolded elastomeric material together forming a grommet assembly for routing the brake pipe through the opening;
- positioning the brake pipe through the body component opening;
- securing the grommet assembly to the brake pipe prior to mounting of the grommet assembly in the opening; and
- mounting the secured grommet assembly in the body component opening, the grommet assembly providing a fixing point for the brake pipe at a center of the body component opening.

* * * * *